Figure 4:
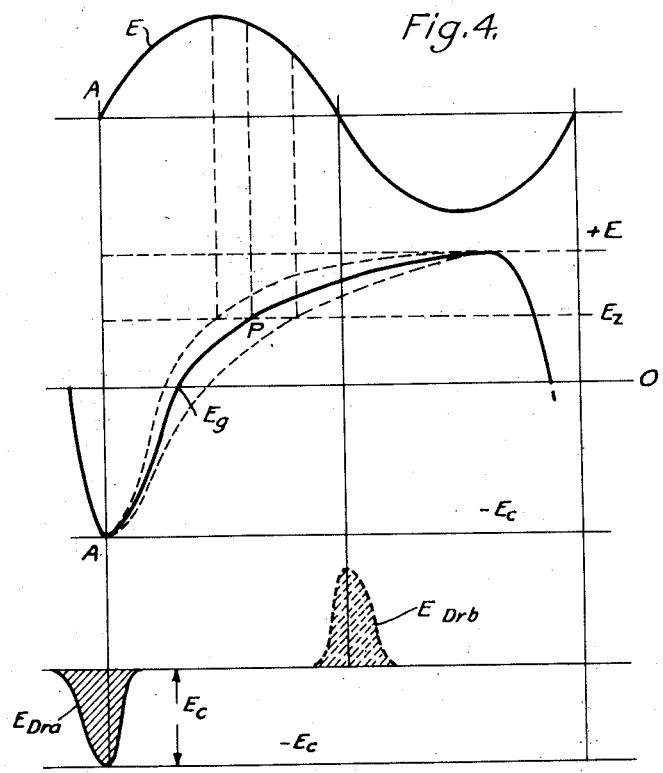

Nov. 12, 1935.    R. G. BERTHOLD ET AL    2,020,930
CONTROL OF ELECTRIC VACUUM DISCHARGE TUBES
Filed Jan. 14, 1933    3 Sheets-Sheet 1
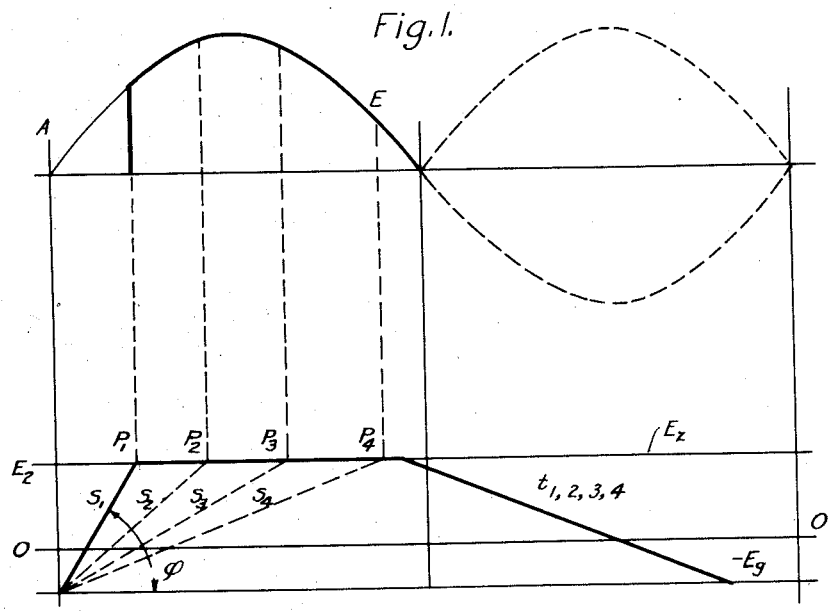
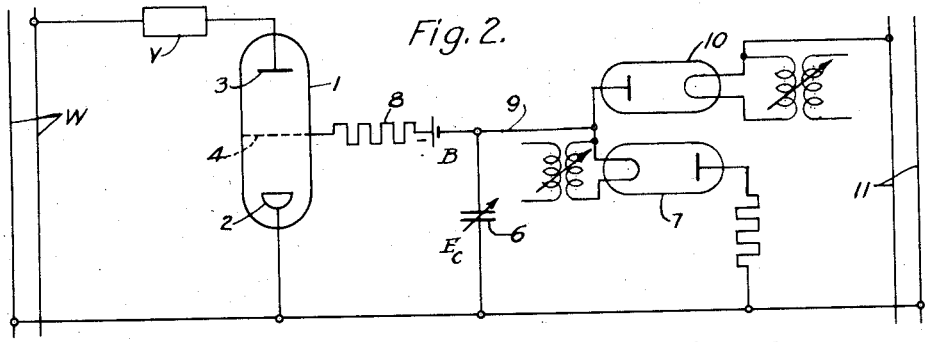
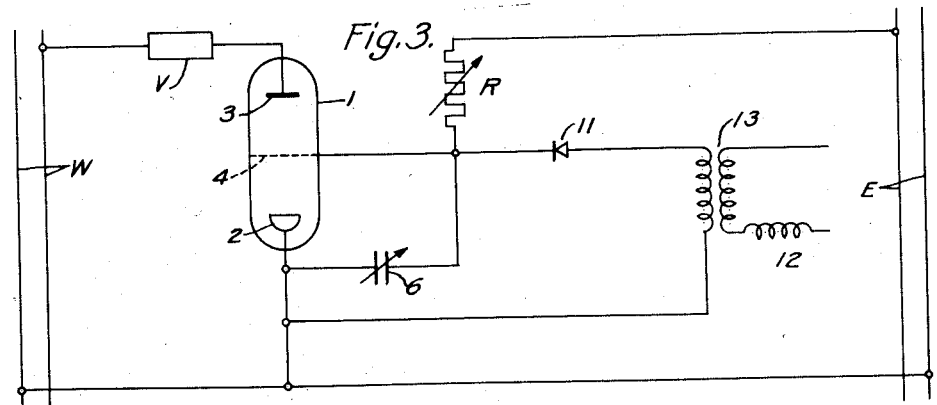
WITNESSES:
INVENTORS
Rudolf G. Berthold,
Max Steenbeck &
Alfred von Engel
BY
ATTORNEY

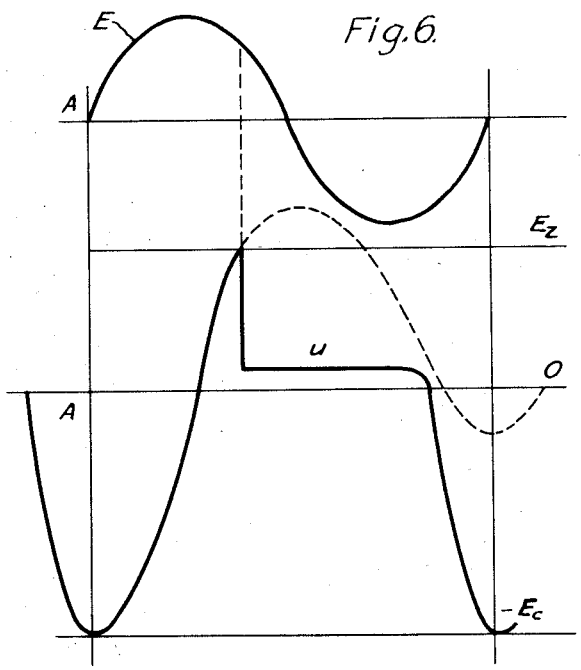
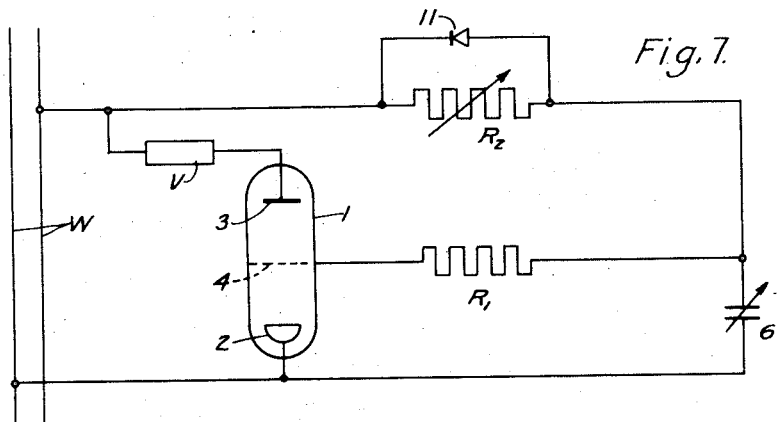
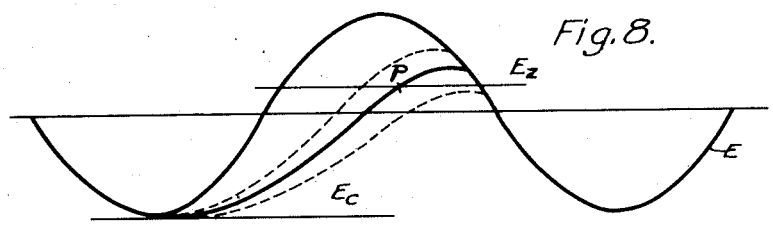

Patented Nov. 12, 1935

2,020,930

UNITED STATES PATENT OFFICE 2,020,930

CONTROL OF ELECTRIC VACUUM DISCHARGE TUBES

Rudolf G. Berthold, Berlin-Siemensstadt, Max Steenbeck, Berlin-Westend, and Alfred Von Engel, Berlin-Siemensstadt, Germany, assignors to Westinghouse Electric & Manufacturing Company, New York, N. Y., a corporation Application January 14, 1933, Serial No. 651,712
In Germany January 20, 1932

4 Claims. (Cl. 250—27)

Our invention relates to the control of electric vacuum discharge tubes. The control of such tubes in which the starting of the discharge current may only be regulated, but not the interruption of the same, has hitherto been effected by applying alternating current or undulatory voltages to the control grid, which voltages are variable as compared to the anode voltages with respect to the position and magnitude thereof. For the control heretofore known, it has been preferable to employ, depending upon the peculiarity of the connections, either alternating current voltages which are variable according to the magnitude and phase or also composite undulatory voltages in the case of which both the alternating current and the direct current component may be rendered variable. However, all these connections require complicated control apparatus, such as particularly wound transformers, contact control apparatus etc.

The object of our invention is to provide a control for thermionic tubes with the aid of control grids which overcomes the foregoing difficulties in an advantageous manner; i. e., the control voltage impressed upon the grid assumes at the beginning of each positive operating half cycle a predetermined negative value and increases with a controllable speed according to a predetermined law of time to such high voltage values that the thermionic tube ignites. Furthermore, means are provided by means of which the grid voltage is again brought to the initial value until the next positive half cycle begins. Since the control methods hitherto employed in thermionic tubes have been provided for varying the position of the grid voltage curve with respect to the anode voltage, the object of the present invention consists in impressing the grid with a voltage which from a fixed point as compared to the position of the anode voltage increases according to a predetermined variable law of time until the desired grid ignition voltage is attained.

Fig. 1 shows a graph in which the method according to our invention is illustrated. The curve E represents the behavior of the anode current or of the anode voltage and the line $E_z$ a measure for the grid ignition voltage measured from the line O. If the grid is impressed with a voltage having a value equal to $E_z$, the ignition of the discharge for the desired portion of a half cycle of the anode current or anode voltage is started. According to the invention the grid is at first impressed with a constant voltage, for instance, $-E_g$ which is lower than the lowest voltage $E_z$ impressed upon the grid required for initiating an ignition. Within a half cycle during which an anode is active, the control voltage impressed upon the grid may be increased according to a predetermined variable law of time.

Fig. 1 discloses the behavior of the grid ignition voltage represented by the line $S_1$. At point $P_1$ the voltage to be impressed upon the grid is attained which is necessary for the ignition, and the discharge starts between the cathode and the relative anode during the half cycle as indicated in the drawing in Fig. 1 by the heavy line. As soon as the ignition of the discharge has been initiated the voltage impressed upon the grid is reduced to the voltage $-E_g$ so that the passage through the operating circuit for a corresponding next half cycle is again checked or the discharge tube is ready to be operated for a new adjustment of the time of ignition. The time for producing the required ignition voltage is, consequently, a function of the angle $\phi$ which is formed by the lines $S_1$ and $-E_g$ at their point of intersection. The point of ignition on the line $E_z$ is attained later or sooner depending upon the line S being more or less inclined to the line $-E_g$ so that it is possible to cut out any curve portion from the half cycle of the anode voltage as is shown in Fig. 1 by the dotted lines $S_2$, $S_3$, $S_4$ and by the corresponding ignition points $P_2$, $P_3$ and $P_4$. However, it is by no means necessary that the increased ignition voltage impressed upon the grid varies according to a straight line but this voltage may also be given the form of a curve (exponential curve etc.) by the use of corresponding devices. In the following are disclosed some of the connections to which the above inventive idea is applicable.

Fig. 2 shows a connection in which the function is linear, according to which the control voltage varies in accordance with the time. 1 denotes the control discharge tube and 2 the cathode, 3 the anode and 4 the grid. The voltage $-B$ of a battery is applied to the grid across a resistance 8. The condenser 6 with the parallel resistance 7 is connected to an alternating voltage source through a valve 10, and the other pole of said source 11 leads to the cathode 2.

The parallel resistance 7 consists, for instance, of a vacuum discharge tube traversed by a constant current. The tube 10 acts as a resistance in the same manner as the tube 7 and under the excitation of the source 11 a constant current flows through it in one direction. The condenser 6 is charged with a predetermined saturation current through the discharge tube 10 acting as a resistance. The velocity with which the curve of the condenser voltage $E_c$ rises may be varied by varying the intensity of the heating current supplied to the tube 10.

The condenser 6 is charged substantially during the half-cycle during which negative anode-cathode potential is supplied to the tube 1. The half-wave of potential applied to the tube 10 is, during this interval, of such polarity that the cathode of tube 10 is negative and the anode positive, and the plate of the condenser which is connected to the control-electrode 4 is charged negative: The charging potential is represented by the curve $t1, 2, 3, 4$. During the opposite half-cycle, the condenser 6 cannot be discharged through the tube 10 but is discharged linearly through the resistance 7 and it is at this time that the control-electrode potential rises along one of the curves $S1, S2, S3, S4$ to one of the points $P1, P2, P3, P4$ at which the ignition is initiated. The charging of the condenser through the tube 10 must of course be terminated at the moment at which the discharging, represented by the lines departing from the point A, is to begin.

It is immaterial according to which form of curve the grid condenser is discharged. The resistance 7 has been chosen in this instance as resistance of constant current in order that the increase of the discharge of the condenser remains linear, since during the time of discharge of the condenser the resistance 7 implies a derivative. The discharge tubes 10 and 7 may as a matter of course also be replaced by other devices which permit the passage of a constant current.

Fig. 3 shows a connection in which the increasing ignition voltage impressed upon the grid varies according to a curve, i.e., in this case according to an exponential curve. The control discharge tube is designated by the numeral of reference 1, 2 denotes the cathode, 3 the anode and 4 the grid. The grid 4 is connected to a circuit in which an electric valve 11 and a secondary winding of a supersaturated transformer 13 is inserted in series with a condenser 6. The other connection of the secondary winding leads to the cathode 2. The primary winding of the transformer 13 is connected through a constant inductance 12 to an alternating voltage having the same frequency as the operating voltage. At the same time the grid is connected to a positive direct current voltage through an adjustable high resistance R. The electric valve 11 is connected in such a manner that it allows the currents to pass in such a direction that the plate of the condenser 6 connected with the grid 4 is negatively charged. The grid voltage condenser receives the direct current voltage through the high resistance R, whereas the negative charge—previous to the moment at which the time function is to be initiated—by the negative half cycle from the circuit; transformer 13 and valve 11, so that as soon as the negative surge coming from the circuit is terminated, the voltage applied to the grid may increase to a constant direct-current voltage E and attain the desired ignition voltage in this manner. This moment is dependent upon the speed with which the steepness of the curve increases which is determined by the magnitude of the high resistance R and the magnitude of the condenser 6.

Fig. 4 shows a graph which illustrates the fluctuations of the voltages according to the connection in Fig. 3. E shows how the anode voltage varies during a half cycle. The direct-current voltage is indicated by the line $+E$, the necessary ignition voltage by the line $E_z$ and the negative condenser voltage by the line $-E_c$. The behavior of the grid control voltage is represented by the curve $E_g$ which parting from the ordinate A—A and increasing in the form of an exponential curve intersects the line $E_z$ in the point P in which the ignition of the discharge between the cathode and the relative anode is initiated. The dotted lines represent the different values of the speed with which the steepness of the curves of the grid control voltage increases, i. e., the exponential curves assume a more or less steep form depending upon the adjustment of the resistance R. The surge caused by the saturated transformer and bringing the positive charge at the end of a cycle to a negative initial charge is represented by the curve $E_{Dra}$. The surge $E_{Drb}$ represented in the diagram by a cross-hatched area is suppressed by the valve 11.

Figure 5:
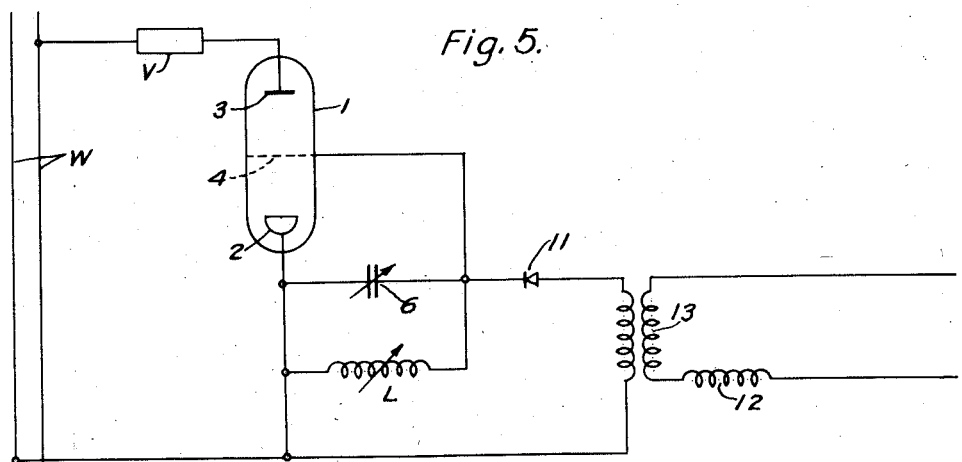

Fig. 5 discloses a connection in which the grid 20 is impressed with a voltage wave by means of an oscillating circuit excited by a sudden voltage surge. The steepness of the voltage curve in its first rising portion is varied depending upon the adjustment of the controllable capacity C or of the regulable inductance L so that the grid control voltage reaches the ignition voltage line sooner or later.

The variations of current corresponding to this connection are shown in the graph 6. As soon as the grid control voltage exceeds the ignition voltage $E_z$, the operating discharge in the vacuum discharge tube is initiated. By means of the grid current flowing between the cathode and the grid as soon as the discharge path in the vacuum discharge tube 1 has become conductive, the condenser 6 will be discharged to a low value U corresponding to the discharge voltage. This value remains approximately constant until the condenser is negatively charged by means of a voltage surge imparted by the transformer 13. This discharge of the condenser by means of the grid current is necessary in order to prevent the oscillations during the operation of the thermionic tube 1 between the operating frequency and the natural frequency of the control circuit (6, L).

A particularly simple connection is represented in Fig. 7. The alternating current source 10 is connected to the anode 3 of the vacuum discharge vessel 1 through the consuming device V. The other pole of the alternating current voltage source is connected to the cathode 2. The grid 4 is connected to a condenser 6 through a high resistance $R_1$ which is to prevent an unlimited increase of the grid current. The condenser 6 is charged to a negative value $E_c$ by the negative half cycle of the alternating current 10 through the valve 11. The positive charge of the condenser can only pass through the variable resistance $R_2$ since in this direction of current the anode is negative. The condenser voltage will increase more or less rapidly from the negative value to its positive ignition voltage value depending upon the magnitude of the resistance $R_2$. Consequently the grid voltage will also vary in accordance with the speed with which the steepness of the curves increases which grid voltage is equal to the condenser voltage. The grid, therefore, receives again previous to the moment at which the time function is to be initiated a negative charge. The behavior of the voltage corresponding to the connection shown in Fig. 7 is illustrated in graph 8.

The above-described controls lend themselves to the control of motors whose speed is brought in agreement with the charge of the motors and with the corresponding operating conditions, for instance, of motors used in connection with lifting devices, rolling-mills, vehicles, machine-tools, also for controlling electrical furnaces etc., in general for such energy consuming devices in which a control of the r. m. s. value of the current is necessary. The efficiency for every speed and r. m. s. value is favorable since the small loss in the high resistance R may be completely disregarded. It is self-evident that the control of the vacuum discharge capacity with the aid of the grid may also be effected automatically by suitable devices such as relays, resistance regulators etc.

The above-described controls possess great advantages for vacuum discharge tubes in remote controlled systems. As soon as the auxiliary discharge in the thermionic tube has been initiated, for instance, by a current surge the fluctuations of the grid voltage may be regulated in a simple manner by varying the resistance of a pilot wire and, consequently, the r. m. s. value of the operating current may be remote controlled through a pilot wire.

This control method and the device for carrying out the same is preferably applied for the rectification, conversion and the like. It is to be understood that it is immaterial in carrying out the method of control whether a mercury cathode, thermionic cathode or the like is employed in the vacuum discharge tube without departing from the scope and the spirit of our invention.

We claim as our invention:—

1. Method for controlling electric discharge tubes having anode, cathode and control electrode and a condenser having one plate connected to the control electrode which comprises rectifying the negative half cycle of an alternating current, negatively charging thereby the condenser plate connected to said control electrode, discharging said condenser at the beginning of the positive half cycle and building up the control electrode voltage to where the tube will ignite with the desired time lag.

2. Method for controlling electric discharge tubes having anode, cathode and control electrode and a condenser having one plate connected to the control electrode which comprises applying alternating current to said anode and cathode for operating the tube, rectifying the negative half cycle of an alternating current of the same frequency, negatively charging by said last mentioned current the condenser plate connected to said control electrode, discharging said condenser at the beginning of the positive half cycle and building up the control electrode voltage to where the tube will ignite with the desired time lag.

3. Method for controlling electric discharge tubes having anode, cathode and control electrode and a condenser having one plate connected to the control electrode which comprises rectifying the negative half cycle of alternating current, applying a voltage surge of said current to negatively charge the condenser plate connected to said control electrode, discharging said condenser at the beginning of the positive half cycle and building up the control electrode voltage to where the tube will ignite with the desired time lag.

4. Method for controlling electric discharge tubes having anode, cathode and control electrode and a variable condenser having one plate connected to the control electrode which comprises rectifying the negative half cycle of an alternating current, negatively charging thereby the condenser plate connected to said control electrode, varying the capacity of the said condenser to vary its rate of discharge, discharging said condenser at the beginning of the positive half cycle and building up the control electrode voltage to ignite the tube.

RUDOLF G. BERTHOLD
MAX STEENBECK.
ALFRED v. ENGEL.